INVENTOR
GERRIT KOOL
BY
Frank R. Trifari
AGENT

INVENTOR.
GERRIT KOOL
BY
AGENT

United States Patent Office 3,315,028
Patented Apr. 18, 1967

3,315,028

CIRCUIT ARRANGEMENT FOR SYNCHRONIZING THE SUB-CARRIER OSCILLATOR IN A COLOR TELEVISION RECEIVER

Gerrit Kool, Emmasingel, Eindhoven, Netherlands, assignor to North American Philips Company, Inc., New York, N.Y., a corporation of Delaware Filed Sept. 3, 1964, Ser. No. 394,166
Claims priority, application Netherlands, Sept. 4, 1963, 297,518
9 Claims. (Cl. 178—5.4)

The invention relates to a circuit arrangement for synchronizing the sub-carrier oscillator in a color television receiver for a color television system in which two signals modulate a sub-carrier in quadrature and the burst signal co-transmitted as a separate synchronizing signal during the occurrence of a back porch between two lines. The circuit arrangement comprises a gate circuit for amplifying at least the burst signal, a first phase discriminator to which are applied at least the burst signal and a signal taken from the oscillator and which forms part of the normal control loop for the synchronizing arrangement by deriving the control voltage for controlling the frequency of the oscillator from this phase discriminator and a second phase-discriminator to which are applied at least the said burst signal and a signal taken from the oscillator with a phase which differs from the phases of the respective signal applied to the first phase-discriminator in a degree such that, if required with the addition of matrix circuits, the output signals from the two phase-discriminators may be regarded as having been produced at a difference of modulation direction of about 90°.

Such an arrangement is known from U.S. patent specification 2,848,537. This known arrangement includes an additional third phase discriminator to which are applied both the signal taken from the first phase discriminator and that taken from the second phase discriminator. The output terminal of this third phase discriminator is connected to the reactance circuit which provides the adjustment of the frequency of the sub-carrier oscillator. In this known circuit arrangement, in an out-of-synchronism condition the beat signals taken from the first and second phase discriminators are compared with one another in the third phase discriminator so that, since both beat signals have the same beat frequency, a direct voltage is produced at the output of this third phase discriminator and this direct voltage is used to control the reactance circuit so that the oscillator frequency is brought so near the frequency of the sub-carrier signal co-transmitted for synchronization that the lock-in mechanism of the conventional control loop is enabled to take over and to make the oscillator frequency exactly equal to the frequency of the sub-carrier signal.

It is the object of the present invention to achieve the same result without the need for a third phase discriminator.

For this purpose the circuit arrangement in accordance with the invention further includes a phase-shifting network connected between an output terminal of the second phase discriminator and an input electrode of the gate circuit.

Since this gate-circuit must in any case be present either to ensure that the burst signal co-transmitted for synchronization can only reach the synchronizing circuit during the horizontal fly-back period or to permit the color killer action, this means that the additional lock-in action solely requires the additional phase-shifting network.

It should be noted that from the article entitled "The D.C. Quadricollerator, a Two Mode Synchronisation System" in PIRE, Vol. 42, January 1954, page 293, it is known to control a gate circuit with the aid of a signal taken from the second phase-discriminator. However, this gate circuit is only opened by the signal derived from the second phase-discriminator in an out-of-synchronism condition so that the beat signal is considerably amplified before reaching the reactance-circuit. Thus, there is no question of producing a direct voltage for controlling the reactance circuit in an out-of-synchronism condituion, as is the case in the circuit arrangement in accordance with the invention. In addition, the said system requires a separate gating tube and the gating circuit present in the arrangement cannot be used for this purpose. The other solution given on the said page 293 (left-hand column, third paragraph) in an out-of-synchronism condition provides only an additional amplification of the sub-carrier signal so that the amplitude of the beat signal derived from the first phase-discriminator in this condition will also increase. However, since this increase is determined by the variation in amplification of the gating tube already present in the arrangement, and since the sub-carrier signal is applied to this gating tube with a considerable amplitude, this variation in amplification can only be slight and hence the increase of the lock-in range can only be a limited one.

Possible embodiments of circuit arrangements in accordance with the invention will now be described with reference to the accompanying drawings, in which.

Figure 1:
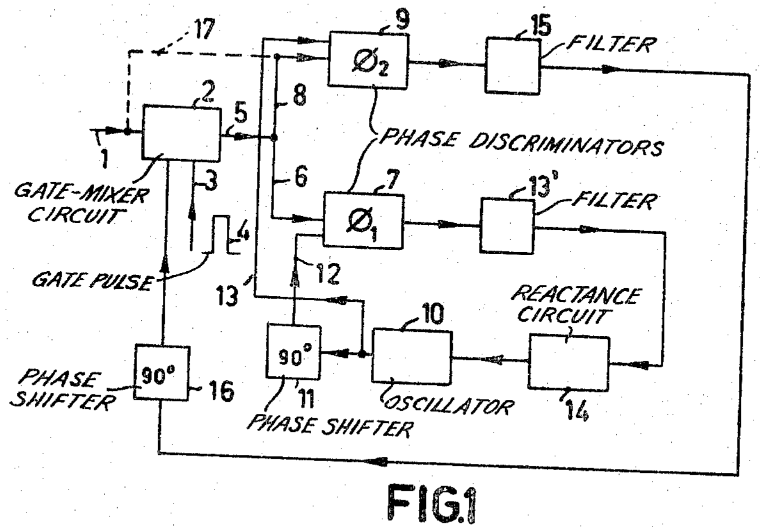
FIG. 1 shows a first embodiment in which the sub-carrier signal co-transmitted for synchronization is handled in a separate synchronizing system.

Referring now to FIG. 1, the detected color signal is applied through a lead 1 to a gate mixer 2. This input signal has a form represented by Equation 1:

$$V_1=\alpha(R-Y)\cos\omega_1 t+\beta(B-Y)\sin\omega_1 t-P\sin\omega_1 t \quad (1)$$

where $\alpha$ and $\beta$ are constants, $R-Y$ and $B-Y$ are the red and blue color difference signal respectively, $\omega_1$ the angular frequency of the sub-carrier signal modulated by the color signals, $t$ the time in seconds and P the amplitude of the sub-carrier signal co-transmitted for synchronization, which signal in the Equation 1 is represented by the term $-P\sin\omega_1 t$.

Through a lead 3 there are also applied to the gate circuit 2 line fly-back pulses 4 which render this gate circuit conductive only during a horizontal fly-back period. Since the sub-carrier signal co-transmitted for synchronization will appear only during this horizontal fly-back period, only the signal $-P\sin\omega_1 t$ will be available at the output 5 of the gate mixer circuit 2. This signal is applied through a lead 6 to a first phase-discriminator 7 and through a lead 8 to a second phase-discriminator 9.

Sub-carrier signals regenerated in an oscillator 10 are applied through a 90° phase-shifting network and the lead 12 to the first phase-discriminator 7 and through a lead 13 to the second phase-discriminator 9. Assuming the output signal of the oscillator 10 to be given by $$\sin(\omega_1 t\pm\varphi)$$

in an in-synchronism condition in which the angular frequency of the sub-carrier signal co-transmitted for synchronization is equal to the angular frequency of the sub-carrier signal regenerated in the oscillator 10, a signal of the form $\cos(\omega_1 t\pm\varphi)$ is applied to the phase-discriminator 7 through the lead 12. In these expressions $\varphi$ represents the phase difference between the co-transmitted and regenerated sub-carrier signals, which phase difference may be positive or negative depending on whether the phase of the regenerated sub-carrier signal leads or lags with respect to the co-transmitted sub-carrier signal.

Consequently, in an in-synchronism condition the output signal of the first phase-discriminator will have a form as shown by Equation 2:

$$-P \sin \omega_1 t \cdot \cos (\omega_1 t \pm \varphi) = -\frac{P}{2} \sin (2\omega_1 t \pm \varphi) + \frac{P}{2} \sin \pm \varphi \quad (2)$$

Through a filter 13′ this output signal is applied to a reactance circuit 14 which is capable of adjusting the frequency of the oscillator 10 by means of the control signal derived from the filter 13′. The filter 13′, which has a large time constant to prevent disturbances in the signal from reaching the reactance circuit 14, eliminates the angular frequency $2\omega_1$ so that the output voltage of 13′ is a direct voltage of the form $$+\frac{P}{2} \sin \pm \varphi$$

which with respect to its value and sign depends upon the phase angle because P is to be regarded as a constant. The part of the circuit arrangement comprising the elements 7, 10, 11, 12, 13′ and 14 may consequently be regarded as the conventional control loop which in an in-synchronism condition ensures that this condition is maintained and that the phase angle $\varphi$ is reduced to a minimum, for the signal derived from the oscillator 10 is also applied to the synchronous modulators, in which the color signals are demodulated, after which they may be applied to the color display tube. The larger the phase angle $\varphi$ the greater the color defects, and hence it is essential for the phase angle $\varphi$ to be reduced to a minimum.

As has been stated hereinbefore, a signal of the form $-P \sin \omega_1 t$ is applied through the lead 8 to the second phase-discriminator 9 and a signal of the form $\sin (\omega_1 t \pm \varphi)$ is applied thereto through the lead 13. Hence the output signal of the second phase-discriminator 9 will be given by the Equation 3:

$$-P \sin \omega_1 t . \sin (\omega_1 t \pm \varphi) = +\frac{P}{2} \cos (2\omega_1 t \pm \varphi) - \frac{P}{2} \cos \pm \varphi \quad (3)$$

The filter 15 again eliminates the angular rfequency $2\omega_1$ so that in an in-synchronism condition the output voltage of the filter 15 will be given by $$-\frac{P}{2} \cos \varphi$$

which term represents a negative direct voltage the value of which is dependent on $\varphi$ but is independent of the sign of $\varphi$. This negative direct voltage may be used as an automatic color control (A.C.C.) voltage for maintaining the color signal constant in the color channel of a color television receiver or as a cut-off voltage for the color killer circuit, which circuit must become operative when the synchronization collapses or when a black-and-white television signal is received.

The output voltage of the second phase-discriminator 9, however, may also serve in an out-synchronism condition to contribute to remove this out-of-synchronism condition, in other words, to contribute to increase the lock-in range of the conventional control loop. As has been stated in the preamble, this is also the purpose of the circuit arrangement described in U.S. patent specification 2,848,-537. In this circuit arrangement, however, the output signal of the two phase-discriminators are applied to a third phase-discriminator, the direct voltage produced by this third phase-discriminator being applied to the reactance circuit in an out-of-synchronism condition in order to bring the frequency of the oscillator as near as possible to the frequency of the sub-carrier signal. In the circuit arrangement according to the invention, however, the said third phase-discriminator may be dispensed with and the same result is achieved by applying the output signal of the filter 15 also through a phase shifting network 16 to an input electrode of the gate mixer circuit 2. The network 16 must in this case be so proportioned that in an out-of-synchronism condition this network shifts the phase of the beat signal taken from the filter 15 by substantially 90° before this beat signal is applied to the gate circuit 2. That in this case a direct voltage is actually applied to the reactance circuit 14 can be proved as follows.

In the following explanation it is assumed that the signal produced by the oscillator 10 in such an out-of-synchronism condition has an angular frequency $\omega_2$, which angular frequency $\omega_2$ may be greater than $\omega_1$ if the oscillator is detuned to a higher frequency but may also be smaller than $\omega_1$ if the oscillator 10 is detuned to a lower frequency. From this it follows that in such an out-of-synchronism condition the signal of the form $$\sin \omega_2 t \quad (4)$$

is applied to the second phase-discriminator 9 through the lead 13. Since the signal applied through the lead 8 does not change its form, the output signal of the discriminator 9 will have a form as represented by the Equation 5:

$$-P \sin \omega_1 t . \sin \omega_2 t = +\frac{P}{2} \cos (\omega_1 + \omega_2) t - \frac{P}{2} \cos (\omega_1 - \omega_2) t \quad (5)$$

The filter 15 again eliminates the term including the sum-frequency $\omega_1 + \omega_2$ so that at the output of the filter 15 a signal appears which has the form $$-\frac{P}{2} \cos (\omega_1 - \omega_2) t$$

the sign of this signal always being negative irrespective whether $\omega_1 > \omega_2$ or $\omega_2 > \omega_1$.

The output signal of the filter 15 is shifted in phase by substantially 90° in the phase-shifting network 16. As a result the signal derived from the filter 15 may be either advanced or retarded. Usually it is retarded. If $\omega_1 > \omega_2$, the output signal of the network 16 will be $$-\frac{P}{2}\{\cos (\omega_1 - \omega_2) t - 90°\} = -\frac{P}{2}\{\cos (\omega_1 - \omega_2) t . \cos 90° + \sin (\omega_1 - \omega_2) t . \sin 90°\} = -\frac{P}{2} \sin (\omega_1 - \omega_2) t \quad (6)$$

However, if $\omega_2 > \omega_1$, we have $$-\frac{P}{2}\{\cos (\omega_2 - \omega_1) t - 90°\} = -\frac{P}{2} \sin (\omega_2 - \omega_1) t \quad (7)$$

from which it will be seen that the beat signal applied to the gate circuit 2 always has the same polarity irrespective whether $\omega_2 > \omega_1$ or $\omega_1 > \omega_2$, which is logical, since the output signal of the second phase-discriminator 9 does not have its sign changed and obviously the passive phase-shifting network 16 cannot cause a change in sign.

If $\omega_1 > \omega_2$, the Equation 6 must be used since in this case a signal of the form given by the Equation 6 is applied to the gate circuit 2 to which is also applied the normal sub-carrier signal $-P \sin (\omega_1 t)$ co-transmitted for synchronization.

In this situation the output signal of the gate circuit 2 becomes:

$$-P \sin \omega_1 t + \left[(-P \sin \omega_1 t) \cdot \left\{-\frac{P}{2} \sin (\omega_1 - \omega_2) t\right\}\right] = -P \sin \omega_1 t + \frac{P^2 \cos \omega_2 t}{4} - \frac{P^2 \cos (2\omega_1 - \omega_2) t}{4} \quad (8)$$

This signal is applied both to the first phase-discriminator 7 and to the second phase-discriminator 9. It still includes the term $-P \sin \omega_1 t$ so that the signal represented by the Equation 5 again appears at the output of the second phase-discriminator 9. The terms of the Equation 8 including the angular frequencies $\omega_2$ and $2\omega_1-\omega_2$ also cause the phase-discriminator 9 to produce output signals, but these signals are not of importance for the present discussion. Obviously the term $-P \sin \omega_1 t$ may alternatively be applied directly to the phase-discriminator 9, as is indicated by a broken line 17 in FIG. 1. In this case the terms including the angular frequencies $\omega_2$ and $2\omega_1-\omega_2$ would not be present in the signal applied to the phase-discriminator 9. In a color television receiver, however, the path through the gate circuit 2 must be taken, because otherwise the color signal reaches the second discriminator 9 so that the output signal of discriminator 9 is dependent upon the color signals, which is undesirable. In addition, it will be seen that after multiplication of the signal represented in Equation 8 by the signal $\sin \omega_2 t$ taken from the lead 13 not only the terms determined by the Equation 5 which include angular frequencies $(\omega_1+\omega_2)$ and $(\omega_1-\omega_2)$ but also terms including $$2\omega_2, 2\omega_1 \text{ and } 2(\omega_1-\omega_2)$$

are produced. Of all these terms the filter 15 passes only the term including $(\omega_1-\omega_2)$ and, in the case of very small differences between $\omega_1$ and $\omega_2$, the term including $$2(\omega_1-\omega_2)$$

also. As will be appreciated, however, the latter term does not contribute to the production of a direct-voltage component in the ultimate output signal of the filter 13' in an out-of-synchronism condition.

For the embodiment shown in FIG. 2 to be discussed more fully hereinafter this is the more undesirable because in an out-of-synchronism condition or in the case of reception of a black-and-white signal no color signal must be applied to the $(B-Y)$ modulator which in the embodiment of FIG. 2 takes over the function of the second phase-discriminator 9. Hence the connection represented by the broken line 17 canot be used in a color television receiver. As follows from the Equation 8 the output signal of the gate circuit 2 includes the term $-P \sin \omega_1 t$ so that, as is indicated by the lead 8, the input signal for the discriminator 9 may also be derived from the gate circuit 2.

The signal represented by the Equation 8 is also applied through the lead 6 to the first phase-discriminator 7, to which in this out-of-synchronism condition is applied through the lead 12 a signal of the form $\cos \omega_2 t$ so that the output signal of this phase discriminator 7 will have a form as indicated by Equation 9:

$$\left[-P \sin \omega_1 t+\frac{P^2 \cos \omega_2 t}{4}-\frac{P^2 \cos (2\omega_1-\omega_2)t}{4}\right]\cdot \cos \omega_2 t=$$
$$\frac{P}{2}\sin(\omega_1+\omega_2)t-\frac{P}{2}\sin(\omega_1-\omega_2)t+\frac{P^2}{8}+$$
$$\frac{P_2 \cos 2\omega_2 t}{8}-\frac{P^2}{8}\cos 2\omega_1 t-\frac{P^2}{8}\cos 2(\omega_1-\omega_2)t \quad (9)$$

This shows that the output signal of the discriminator 7 includes not only very high frequencies $\omega_1+\omega_2$, $2\omega_2$ and $2\omega_1$ and the beat frequencies $\omega_1-\omega_2$ and $2(\omega_1-\omega_2)$ but also a positive direct voltage component of $$\left(\frac{P^2}{8}\right)$$

volt.

This means for the case in which $\omega_1$ is greater than $\omega_2$ that the output signal of the filter 13' includes a positive direct-voltage component of $$\left(\frac{P^2}{8}\right)$$

volt, which also through the reactance circuit 14 adjusts the oscillator frequency in a degree such that this frequency comes so near the angular frequency $\omega_1$ that the conventional control loop comprising the phase discriminator 7, the filter 13', the reactance circuit 14, the oscillator 10 and the phase shifting network 11 is capable of making the oscillator frequency exactly equal to $\omega_1$, so that the in-synchronism condition is restored.

If, however, the out-of-synchronism condition occurs in which $\omega_2>\omega_1$, the Equation 7 must be used since in this case a signal as represented by the Equation 7 will be applied to the gate circuit 2. In this case the output signal on the lead 5 will be given by Equation 10:

$$-P \sin \omega' t+\left[(-P \sin \omega_1 t)\cdot\left\{-\frac{P}{2}\sin \omega_2-\omega_1)t\right\}\right]=$$
$$-P \sin \omega_1 t+\frac{P^2}{4}\cos(2\omega_1-\omega_2)t-\frac{P^2}{4}\cos \omega_2 t \quad (10)$$

This signal also is applied to both phase-discriminators 7 and 9. To the phase-discriminator 9 the same considerations apply as when $\omega_1>\omega_2$, so that no change is produced in the output signal of the discriminator 9.

A change is produced, however, in the output signal of first phase-discriminator 7. This output signal is now given by Equation 11:

$$\left[-P \sin \omega_1 t+\frac{P^2}{4}\cos(2\omega_1-\omega_2)t-\frac{P^2}{4}\cos \omega_2 t\right]\cdot \cos \omega_2 t=$$
$$-\frac{P}{2}\sin(\omega_1+\omega_2)t+\frac{P}{2}\sin(\omega_2-\omega_1)t-\frac{P^2}{8}-\frac{P^2}{8}\cos 2\omega_2 t$$
$$+\frac{P^2}{8}\cos 2\omega_1 t+\frac{P^2}{8}\cos 2(\omega_2-\omega_1)t \quad (11)$$

Again, the direct-voltage component only is important and from Equation 11 it follows that a negative direct-voltage component of $$-\frac{P^2}{8} \text{ volt}$$

becomes available. This is necessary because $\omega_2>\omega_1$ and consequently the oscillator is detuned in a direction opposite to that when $\omega_1>\omega_2$ so that a direct voltage of opposite polarity must become available to cause the oscillator frequency to approach the angular frequency $\omega_1$ so closely as to enable the normal control loop to complete the exact equalization of the frequencies.

From the above it follows that in an out-of-synchronism condition a direct voltage is always produced which in absolute value is equal to $$\left|\frac{P^2}{8}\right|$$

volts.

In an in-synchronism condition the control voltage for the reactance circuit 13 is given by Equation 2. From Equation 2 it follows that the maximum control voltage is produced when $\varphi=90°$. In this case the absolute value of the control voltage is equal to $$\left|\frac{P}{2}\right|$$

volts. This means that the normal control loop is capable of holding deviations in which a control voltage of $$\left|\frac{P}{2}\right|$$

volts is produced, in other words, the hold range of the normal control loop is determined by the deviation in which a maximum direct voltage of $$\left|\frac{P}{2}\right|$$

volts is produced.

In an out-of-synchronism condition a direct voltage of $$\left|\frac{P^2}{8}\right|$$

volts is produced. Consequently the lock-in range of the entire circuit arrangement shown in FIG. 1 is determined by the quotient:

$$\frac{\frac{P^2}{8}}{\frac{P}{2}}=\frac{P}{4}$$

This means: lock-in range $=P/4$ times hold range. Consequently if $P=1$ the lock-in range is one quarter of the hold range. By making the hold range large a large lock-in range is obtainable without disturbances becoming troublesome since the filter 13′ may have a large time constant.

Figure 2:
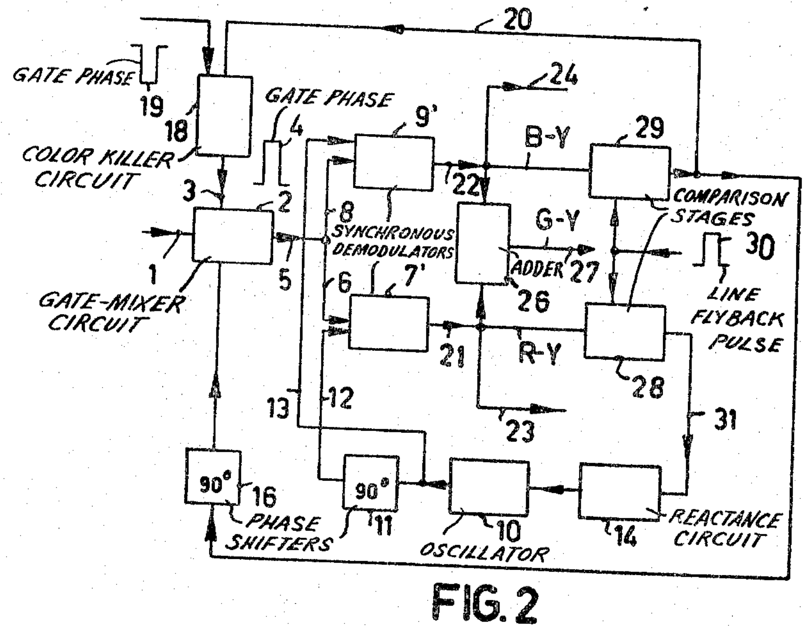
FIG. 2 shows a second embodiment in which the synchronous demodulators for demodulating the color signals and the synchronizing system are partly combined.

In the embodiment shown in FIG. 2, in which as far as possible like parts are designated by reference numerals corresponding to those of FIG. 1, the synchronizing device is partly combined with the synchronous demodulators. This is achieved by deriving the keying pulses which through the lead 3 are applied to the gate circuit 2 from a color killer circuit 18 to the input of which negative-going keying pulses 19 are applied and to which is also applied through a lead 20 a negative voltage of a value such that in an in-synchronism condition either the circuit 18 is completely cut-off or the keying pulses 19 are amplified in a degree such that keying pulses 4 are produced which have an amplitude which is incapable of completely cutting-off the gate circuit 2 so that the input signal given by Equation 1 is always transmitted both during the time of the forward stroke and during the fly-back period. This signal is applied through the lead 6 to a first synchronous demodulator 7′ which during the fly-back period acts also as the first phase-discriminator 7 of FIG. 1. The output signal of the gate circuit 2 is also applied through the lead 8 to a second synchronous demodulator 9′ which during the fly-back period also acts as a second phase-discriminator and hence during this fly-back period fulfils the same function as the second discriminator 9 of FIG. 1.

The signals derived from the oscillator 10 are applied through the leads 12 and 13 to the demodulators 7′ and 9′, and these signals are the same as those applied to the phase-discriminators 7 and 9 in the circuit arrangement of FIG. 1. Assuming for the sake of simplicity the phase angle $\varphi$ to be equal to 0, in an in-synchronism condition during the time of the forward stroke the red color difference signal R–Y will be produced at an output terminal 21 of the first demodulator 7′ and the blue color difference signal B–Y at an output terminal 22 of the second synchronous demodulator 9′. The red color difference signal R–Y is applied through a lead 23 to the control electrode of the red gun of the color display tube while the blue color difference signal is applied through a lead 24 to the control electrode of the blue gun. These two color difference signals are also applied to a circuit 26 from the output terminal 27 of which may be taken the green color difference signal G–Y which is applied to the control electrode of the green gun. However, the output signals of the demodulators 7′ and 9′ are also applied to comparison stages 28 and 29. To these comparison stages are also applied keying pulses 30 which cause these stages to be operative only during the horizontal fly-back time. The comparison stages 28 and 29 include filters so that the output signals of the stages 28 and 29 will be identical with the output signals of the filters 13 and 15 of FIG. 1. This is to say that in an in-synchronism condition there will appear at an output terminal 31 a control signal of the shape $$+\frac{P}{2}\sin\pm\varphi$$

which is applied as a control signal to the reactance circuit 14. At the output terminal 20 of the second comparison stage 29 will appear the negative direct voltage as given by the expression $$-\frac{P}{2}\cos\varphi$$

Now there are two alternatives. The first alternative is that this negative direct voltage is so large that in an in-synchronism condition the color killer stage 18 is completely cut-off so that no keying pulses 4 will be produced on the lead 3. In this case the signal given by Equation 1 is completely transmitted to the demodulators 7′ and 9′ and the comparison stages 28 and 29 have to ensure that the required control signals become available at the terminals 20 and 21 during the horizontal fly-back time only.

The second alternative is that in an in-synchronism condition the negative direct voltage taken from the terminal 20 has a value such that the output pulses 4 have an amplitude such that during the time of a horizontal forward stroke they do not completely cut-off the gate circuit 2 and during a horizontal fly-back time they render it slightly more conductive. Thus the color signal can reach the demodulators 7′ and 9′, however, during the horizontal fly-back period the sub-carrier signal co-transmitted for synchronization is amplified in a slightly higher degree because during this horizontal fly-back period the keying pulses 4 open the gate circuit 2 to a slightly greater extent than during the time of the horizontal forward stroke.

If an out-of-synchronism condition occurs, a beat signal of the form $$-\frac{P}{2}\cos(\omega_1-\omega_2)t$$

is produced at the output terminal 20 in a manner similar to that described with respect to the circuit arrangement of FIG. 1, and this signal is applied through the network 16 to the gate circuit 2. However, by means of a smoothing network included in the color killer circuit 18 this beat signal is eliminated so that the negative voltage for the color killer circuit 18 collapses and this circuit amplifies the keying pulses 19 in a maximum degree so that the keying pulses 4 also will be given a maximum amplitude.

Since in actual fact the negative bias voltage for the gate circuit 2 also collapses (for in an out-of-synchronism condition only the beat signal is operative), in an out-of-synchronism condition the above procedure achieves two things. Firstly during the horizontal fly-back time the gate circuit is adjusted to maximum amplification and secondly during the period of the forward stroke it is cut off. Hence the color signals cannot penetrate to the demodulators 7′ and 9′, unlike the sub-carrier signal co-transmitted for synchronization, which does penetrate thereto with a greater amplitude than in an in-synchronism condition. Hence the same lock-in mechanism as described with reference to the circuit arrangement of FIG. 1 becomes operative. This causes the in-synchronism condition to be restored, enabling the negative direct voltage to be applied again to the color killer circuit 18 and the normal demodulation of the color signals to be resumed.

It should be noted that in an in-synchronism condition the negative direct voltage produced at the output terminal 20 can only be applied, through the network 16, to the gate circuit 2 if this network 16 constitutes a direct connection between the second comparison stage 29 and the gate circuit 2. In this case the said negative direct voltage may act as an automatic control voltage and ensure that the amplitude P of the sub-carrier signal co-transmitted for synchronization remains constant, which is necessary because the magnitude of the control signal applied through the output terminal 31 to the reactance circuit 14 must be dependent exclusively on the phase angle $\varphi$ and not upon the amplitude P. There is the additional advantage that in an out-of-synchronism condition the amplification of the gate circuit 2 increases so that the value of P and hence the direct voltage of $P^2/8$ volts also increase. Thus the lock-in range is increased still further. If for some reason such a control voltage is not desirable a blocking capacitor may be connected in the lead between the second comparison stage 29 and the gate circuit 2. However, since in an out-of-synchronism condition even the very low frequencies of the beat signal produced at the output terminal 20 must be transmitted to the gate circuit 2 and at these very low beat frequencies also the phase-shift in the network 16 must approach as close as possible to 90°, the provision of such a blocking capacitor is to be avoided, the more so as it also cancels the advantage of the additional amplification in an out-of-synchronism condition. Although at the said very low beat frequencies the complete direct voltage component of $$\frac{P^2}{8}$$

volts cannot be produced, however, the better the low beat frequencies reach the gate circuit 2 through the phase-shifting network 16 and the higher the value of P, the less will this direct-voltage component be attenuated at the low frequencies. This is necessary because this direct voltage must be capable of bringing the oscillator frequency so near the synchronizing frequency $\omega_1$ that the normal control loop, which in the embodiment of FIG. 2 comprises the first synchronous demodulator 7′, the first comparison stage 28, the reactance circuit 14, the oscillator 10 and the phase-shifting network 11, is capable of taking over the lock-in action.

It will be appreciated that for the higher beat frequencies the phase shift by means of the network 16 will not be exactly equal to 90° either. Hence at the higher frequencies also the direct-voltage component will be attenuated. Consequently it is of importance that the filter 16 should be appropriately proportioned so that the phase shift of the signal derived from the second comparison stage 29 approximates to 90° as far as possible in a comparatively large frequency range. Obviously, similar considerations apply to the circuit arrangement of FIG. 1.

The particular advantage of lock-in circuit arrangements of the kind under consideration (i.e. the above described circuits, but also the circuits described in Swiss patent specification 229,755, FIG. 5, British patent specification 765,855, FIGS. 3 to 6 and U.S. patent specification 2,848,537 FIGS. 3 to 6) consists in that the influence of the noise is reduced also in an out-of-synchronism condition. This is proved in British patent specification 765,856, especially the passage from page 8, line 35, to page 9, line 44. This means that owing to the fact that the additional control signal produced in an out-of-synchronism condition is a direct voltage (see the above deduced direct voltage component of $P^2/8$ volts) the filter through which this control signal is applied to the reactance circuit may have a very large time constant (and consequently a very small bandwidth).

Now there is a correlation between the oscillator signal and the fixed synchronizing signal because, although they differ in frequency, the frequency of the synchronizing signal for one determined out-of-synchronism condition differs from the frequency of the oscillator signal by a fixed amount, which amount is effectively measured by the synchronizing circuit, however, there is no correlation between the oscillator signal and the noise because the noise signal may vary both in amplitude and in frequency. Hence, the noise signal will produce an output voltage which fluctuates about the fixed direct voltage of $P^2/8$ volts. However, since the time constant of the filter 13′ is made very large, this fluctuation due to the noise will not be passed by the filter 13′ nor by the filter included in the comparison stage 28. In other words, in an out-of-synchronism condition also the influence of the noise is slight owing to the fact that the filter included in the normal control loop need not be changed over, as is the case, for example, in lock-in circuit in which in an out-of-synchronism condition the time constant of the filter in the control loop proper is reduced by means of a switch.

In the circuits in which during locking-in a gate circuit is open either to amplify the beat signal (c.f. for example FIG. 5 on page 293 of PIRE, January 1954) or to apply the synchronizing signal directly to the oscillator for direct synchronization, the noise signal is applied either directly to the reactance circuit (c.f. the said FIG. 5 on page 293 of PIRE, January 1954) or directly to the oscillator so that the influence of the noise is greatly enhanced by rendering the filter inoperative.

In the circuit arrangement in accordance with the invention, however, only a single high-quality filter is required (the filter 13′ or the filter included in the comparison stage 28) whereas in the known circuit arrangement in addition to the high-quality filter in the control loop proper an additional filter must be connected after the third phase-discriminator (the filter 41, 42, 43 in FIG. 1 of the British patent specification 765,856 is the filter in the control loop proper and the filter 35, 36, 37, 38 is the additional filter succeeding the tube 33 acting as a third phase-discriminator) so that the circuit arrangement in accordance with the invention saves not only a tube but also a filter.

It can also be calculated that the influence of the additional control loop, i.e. the loop constituted by the second phase-discriminator 9 or 9′, the filter 15 or the comparison stage 29, the phase-shifting network 16 and the gate circuit 2, in an in-synchronism condition is such that the disturbance due to the noise in this additional control loop may be regarded as a second-order effect compared with the disturbing influence of the noise in the control loop proper. Since a second-order effect as a rule is negligible compared with a first-order effect, the disturbing influence of the noise in the additional control loop may be disregarded under normal conditions, i.e. at a reasonably satisfactory signal-to-noise ratio enabling a fair television image to be viewed.

However, if one should want to eliminate this second-order effect also, while it must be kept in mind that the first-order effect of the normal control loop persists, this may be effected in a very simple manner, for example, by including in the lead between the phase-shifting network 16 and the gate circuit 2 an additional gate tube which is cut-off in an in-synchronism condition by the negative direct voltage $$\frac{P}{2}\cos\varphi$$

derived from the filter 16 in this condition, so that the additional control loop is inoperative in an in-synchronism condition. In this case the gain made by the circuit arrangement in accordance with the invention consists only in saving a smoothing filter, however, for a fair comparison with the known circuit arrangement it should be noted that this circuit arrangement does not include means for eliminating the second-order effect.

However, since synchronization is usually to be effected at a reasonably satisfactory signal-to-noise ratio because otherwise no satisfactory color image can be viewed, the circuit arrangement in accordance with the invention in practice enables a tube and a filter to be saved.

Figure 3:
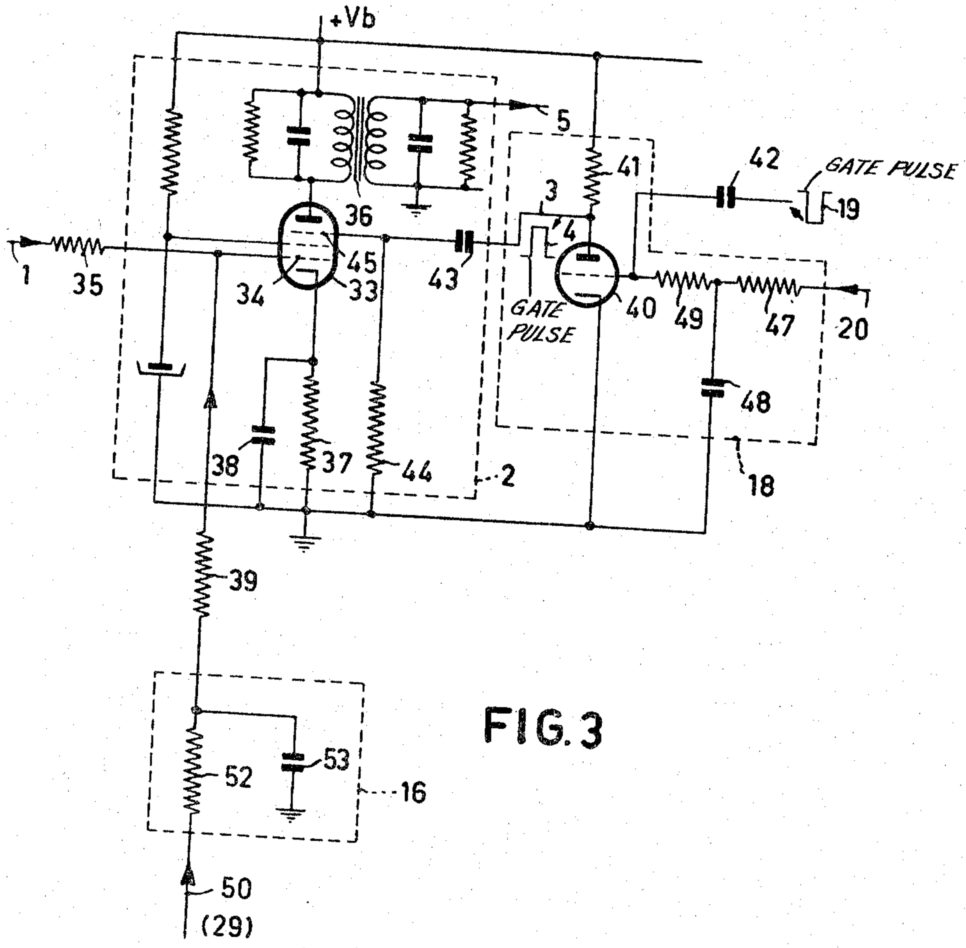
FIG. 3 shows the gate circuit and the associated color killer circuit for use in the circuit arrangement of FIG. 2.

FIG. 3 shows in more detail the circuit diagrams of the gate circuit 2 and the color killer circuit 18. The gate circuit 2 includes a multigrid tube 33 to the first control grid 34 of which the input signal $V_i$ as given by Equation 1 is applied through the lead 1 and a resistor 35. The anode circuit of the tube 33 includes a circuit 36 which has the bandwidth required to pass the color signals and is tuned to the angular frequency $\omega_1$ of the co-transmitted sub-carrier. Thus, the circuit 36 can transmit the amplifier input signals to the lead 5 through which they are applied through leads 6 and 8 to demodulators 7′ and 9′ respectively. The cathode of the tube 33 is connected to earth through a network comprising a resistor 37 and a capacitor 38, across which network a positive direct voltage is produced which serves as a bias voltage for the first control grid 34. Through a resistor 39 the first control grid 34 is connected to the phase-shifting network 16 through which the output signal taken from the second comparison stage 29 is applied. The network 16 comprises a resistor 52 of 1.7 mΩ and a capacitor 53 of 1500 pf. This network provides a reasonably satisfactory compromise for shifting the phase of the beat frequency and also provides a direct connection between the second comparison stage 29 and the gate circuit 2. Such a network 16 provides a lock-in range of ± 250 cycles per second when the frequency of the sub-carrier signal is 3.58 mc./s. Thus, in the in synchronism condition there is applied to the first control grid 34 a negative direct voltage which may act as an automatic color control (A.C.C.) voltage for maintaining the color signal constant. In an out-of-synchronism condition the beat signal is applied to the screen grid 34 so that in the multigrid tube 33 additive mixing will be performed, as shown by Equation 8 if $\omega_1$ is greater than $\omega_2$ or by Equation 10 if $\omega_2$ is greater than $\omega_1$. The signals represented by the Equations 8 and 10 can be transmitted through the circuit 36 because, as mentioned hereinbefore, the circuit 36 which is tuned to the angular frequency $\omega_1$ must have a given bandwidth enabling it to transmit the signal at the angular frequency $\omega_2$ and the signal at the angular frequency $2\omega_1-\omega_2$.

The color killer circuit 18 comprises a triode 40 the anode circuit of which includes an anode resistor 41 and to the control grid of which are applied negative-going line fly-back pulses 19 through a capacitor 42 so that across the anode resistor 41 the keying pulses 4 may be produced the amplitude of which depends upon the value of the control voltage which through a lead 20 is also applied to the control grid of the triode 40. The keying pulses 4 are also applied, through a capacitor 43 and a grid leak resistor 44, to a second control grid 45 of the multigrid tube 33. In an in-synchronism condition the negative direct voltage, which is applied through the lead 20 and is smoothed by means of a smoothing network comprising a resistor 47 and a capacitor 48 and subsequently is applied to the control grid of the triode 40 through an isolating resistor 49, may have a value such that the triode is completely cut-off. In this case no keying pulses 4 are produced and the control grid 45 is at earth potential. The tube 33 now acts normally as an amplifier for the input signal $V_i$. However, if an out-of-synchronism condition occurs, the beat signal is produced at the terminal 20, however, this signal cannot pass through the smoothing network 47, 48. A triode 40 is rendered as conductive as possible and amplifies the pulses 19 so that the pulses 4 reach the control grid 45 through the capacitor 43 with maximum amplitude. As a result, in the peaks of the keying pulses 4 the control grid 45 will carry grid current and hence clamp these peaks to cathode potential. From this it follows that the multigrid tube 33 can carry current during the horizontal fly-back time but is completely cut-off by the pulses 4 during the time of the horizontal forward stroke. This means that in an out-of-synchronism condition the sub-carrier signal co-transmitted for synchronization only is amplified in the tube 33. When the in-synchronism condition is restored the negative voltage at the terminal 20 becomes operative again and the tube 40 is cut off again.

It will be appreciated that the negative voltage applied to the control grid of the tube 40 may have a value such that the pulses 4 will have so small an amplitude that when their peaks are clamped to cathode potential by supplying grid current to the control grid 45, the pulses do not completely cut off the tube 23 during the time of the horizontal forward stroke, permitting the color signals to be amplified although with a slope less steep than the sub-carrier signal co-transmitted for synchronization. When the negative voltage at the terminal 20 collapses again, again the amplitude of the pulses 4 is increased and the tube 33 will be cut-off during the time of the horizontal forward stroke and be completely conductive during the horizontal fly-back time.

The gate circuit 2 shown in FIG. 3 may also be used in the embodiment shown in FIG. 1, however, without the provision of the color killer circuit 18. In this case the lead 20 is not connected to the second comparison stage 29, as in the embodiment of FIG. 2, but to the filter 15, as is shown in FIG. 1. Otherwise the operation of the gate circuit remains the same as described with respect to the embodiment of FIG. 2, since the keying pulses 4 are always produced with an amplitude such that when their peaks are clamped to anode potential by grid current flowing to the control grid 45 the tube 33 will be cut off during the horizontal fly-back time and consequently the color signals cannot reach the phase-discriminators 7 and 9 through the leads 6 and 8. The color signals are in this case separately that means not through the lead 1 applied to the synchronous demodulators. Such a circuit arrangement is of particular importance if single-gun display tubes are used for reproducing the color signals, because in this case synchronous demodulation may be effected in the display tube itself.

It will also be appreciated that the multigrid tube 33 may alternatively have more than two control grids. If this tube has three control grids, which may be separated by screen grids, the input signal $V_i$ may be applied to the first control grid, the end of the resistor 39 not connected to the phase-shifting network 16 may be connected to the second control grid and the pulses 4 may be applied to the third control grid. In this case, in contra-distinction to the embodiment of FIG. 3 in which in an out-of-synchronism condition additive mixing was effected of the signals applied through the resistors 35 and 39, multiplicative mixing will be performed of the sub-carrier signal co-transmitted for synchronization and the beat signal derived from the filter 15 or from the comparison stage 29.

Finally it should be noted that in the foregoing it is assumed that a signal taken from the oscillator 10 is applied to the phase-discriminators 7 and 9 or to the demodulators 7′ and 9′ with a 90° phase difference. In the embodiment of FIG. 1, however, instead of the oscillator signal the co-transmitted sub-carrier signal may be shifted in phase by 90°. This may, for example, be achieved by including the filter 11 of FIG. 1 in the lead 6 instead of in the connection between the oscillator 10 and the first phase-discrimantor 7.

In the embodiment of FIG. 2 the demodulation may be performed in two directions differing by less than 90°, the output signals of two demodulators being added to one another in an additional matrix circuit in a manner such that substantially the red $(R-Y)$, blue $(B-Y)$ and green $(G-Y)$ color difference signals are produced. In this case, the phase-shifting network 11 of FIG. 2 will have to cause a phase-shift of less than 90°.

Thus, the red color difference signal $(R-Y)$ at the output of the matrix circuit may be identical with the output signal of the first synchronous demodulator 7′ in the embodiment of FIG. 2. Hence this output of the matrix circuit may be connected to the input of the first comparison stage 28 to obtain the same control signal as in the embodiment of FIG. 2.

Similarly it may be proved that if the input of the second comparison stage 29 is connected to that output of the matrix circuit from which the blue color difference signal $(B-Y)$ is derived, the output voltage of the stage 29 will be equal to that in the embodiment of FIG. 2. When two demodulators and a matrix circuit are used the signal obtained after demodulation is concerned.

What is claimed is:

1. A circuit arrangement for synchronizing the sub-carrier oscillator in a color television receiver for use in a color television system in which two color signals modulate a sub-carrier in quadrature and the burst signal is co-transmitted as a separate synchronizing signal during the occurrence of a back-porch between two lines, which circuit arrangement includes a gate circuit for amplifying at least the burst-signal, a first phase-discriminator to which are applied at least the said burst signal and a signal derived from the oscillator, this first phase-discriminator forming part of the normal control loop of the synchronizing circuit owing to the fact that from this phase-discriminator is derived the control voltage for controlling the frequency of the oscillator, and a second phase discriminator to which are applied at least the burst signal and a signal derived from the oscillator with a phase differing from the phase of the corresponding signal applied to the first phase-discriminator in a degree such that, if required with the addition of matrix circuits, the output signals taken from the two phase-discriminators may be regarded as produced by a difference in direction of demodulation of about 90°, wherein the improvement comprises a phase-shifting network connected between an output terminal of the second phase-discriminator and an input electrode of the gate-circuit whereby the output of said phase shifting network is mixed with said burst signal.

2. A circuit arrangement as claimed in claim 1, wherein the connection between the second phase-discriminator and the input electrode of the gate circuit is a D.C. connection.

3. A circuit arrangement as claimed in claim 1, wherein the gate circuit is constituted by a multigrid tube to the first control grid of which is applied the once detected color signal containing information about the colors and about the burst signal, said first control grid of this multigrid tube also being said input electrode to which the phase shifting network is coupled, and means for applying line flyback pulses having a polarity which renders the tube conductive to a further control grid of said tube.

4. A circuit arrangement as claimed in claim 1, wherein a second gate circuit which in an in-synchronism condition is cut off is provided between the input electrode of the gate circuit and the phase-shifting network.

5. A color-subcarrier oscillator synchronizing circuit for a color television receiver of color television signals of the type in which said signals have a burst signal transmitted as a synchronizing signal between lines of video information, said circuit comprising a source of said signals, a color-subcarrier oscillator for generating reference oscillations, first and second phase discriminating means, means for applying said oscillations to said first and second discriminating means with a relative phase difference of 90 degrees, a gate-mixer circuit having first and second input terminals, a gating terminal, and an output circuit, means applying said signals to said first input terminal, means connecting said output circuit to said first and second discriminating means, a source of gating pulses, means for applying said gating pulses to said gating terminal, frequency control means for said oscillator, means for applying the output of said first discriminating means to said frequency control means, means for shifting the phase of the output of said second phase discriminating means by 90 degrees, and means for applying the output of said phase shifting means to said second input terminal whereby said signals are mixed with the phase shifted output of said second discriminating means in said gate-mixer circuit.

6. A demodulator circuit for color television signals of the type in which two color signals modulate a sub-carrier in quadrature, and a burst signal is transmitted as a synchronizing signal between adjacent lines of said color signals, said circuit comprising a source of said television signals, color-subcarrier oscillator means for generating reference oscillations, said oscillator means having frequency control means, first and second synchronous demodulators, means for applying said reference oscillations in quadrature to said synchronous demodulators, a combined gate-mixer circuit having first and second input terminals whereby signals applied to said first and second terminals are mixed in said gate-mixer circuit, a gating terminal, and an output circuit, means applying said television signals to said first input terminals, means connecting said output circuit to said first and second demodulators, whereby said first and second color signals are recovered at the output of said first and second demodulators respectively, means applying the output of said first demodulator to said frequency control means for synchronizing said oscillator, 90 degree phase shift means, means for applying output of said second demodulator means to said second input terminal by way of said phase shift means, a source of gating pulses, and means applying said gating pulses to said gating terminal.

7. The demodulator circuit of claim 6 in which said source of gating pulses is a color killer circuit, comprising means for applying line flyback pulses to said color killer circuit, means for applying the output of said second demodulator to said color killer circuit, and means for applying the output of said color killer circuit to said gate-mixer circuit, said color killer circuit comprising means responsive to the output of said second demodulator for applying gate pulses to said gate-mixer circuit only when said oscillator is out of synchronism with said burst signals.

8. The demodulator circuit of claim 7 in which said gate-mixer circuit comprises a multielectrode electron discharge device having at least two control electrodes, comprising means connecting each of said first and second terminals to a control electrode of said device, and time constant means applying said gate pulses to another control electrode of said device whereby said device is conductive in the continued absence of said gate pulses, is conductive during the time of occurrence of said gate pulses, and is cut-off between adjacent said gate pulses.

9. The demodulator circuit of claim 7 in which said color killer circuit comprises an amplifier device having input, output and common electrodes, means for applying said line flyback pulses to said input electrode whereby gating pulses are produced at said output electrode, capacitor means for connecting said output electrode to said gate-mixer circuit, and means for applying the output of said second demodulator to said input electrode with a polarity to cut-off said device when said oscillator is synchronized with said burst signal, said means for applying the output of said second demodulator to said input electrode comprising filter means whereby a heat signal at the output of said second demodulator when said oscillator is out of synchronism cannot cut-off said device.

References Cited by the Examiner

UNITED STATES PATENTS

| | | | |
|---|---|---|---|
| 2,848,537 | 8/1958 | Richman | 178—5.4 X |
| 2,890,270 | 6/1959 | Richman | 178—5.4 |
| 2,922,839 | 1/1960 | Richman | 178—5.4 |
| 2,954,425 | 9/1960 | Richman | 178—5.4 |

DAVID G. REDINBAUGH, *Primary Examiner.*

J. A. O'BRIEN, *Assistant Examiner.*

UNITED STATES PATENT OFFICE

CERTIFICATE OF CORRECTION

Patent No. 3,315,028 April 18, 1967

Gerrit Kool

It is hereby certified that error appears in the above numbered patent requiring correction and that the said Letters Patent should read as corrected below.

Column 1, line 27, for "phases" read -- phase --; column 2, line 9, for "condituion" read -- condition --; line 37, afte "mixer" insert -- circuit --; column 5, line 52, for "$\frac{P}{2}$", first occurrence, read -- $\frac{-P}{2}$ --; line 71, strike out "also"; column 6 line 10, for "$\omega^1 t$" read -- $\omega_1 t$ --; column 12, line 52, for "dis crimantor" read -- discriminator --.

Signed and sealed this 7th day of November 1967.

(SEAL)
Attest:

Edward M. Fletcher, Jr.
Attesting Officer

EDWARD J. BRENNER
Commissioner of Patents